United States Patent
Gimenez et al.

(10) Patent No.: US 12,296,752 B2
(45) Date of Patent: May 13, 2025

(54) VEHICLE PRINTER MOUNT

(71) Applicant: Westin Automotive Products, Inc., San Dimas, CA (US)

(72) Inventors: Oscar Haroldo Gimenez, Southington, CT (US); Adam John Carbone, Southington, CT (US)

(73) Assignee: Westin Automotive Products, Inc., San Dimas, CA (US)

( * ) Notice: Subject to any disclaimer, the term of this patent is extended or adjusted under 35 U.S.C. 154(b) by 486 days.

(21) Appl. No.: 17/684,966

(22) Filed: Mar. 2, 2022

(65) Prior Publication Data

US 2022/0388456 A1    Dec. 8, 2022

Related U.S. Application Data (60) Provisional application No. 63/196,998, filed on Jun. 4, 2021.

(51) Int. Cl.
| | |
|---|---|
| *B41J 29/06* | (2006.01) |
| *B41J 15/04* | (2006.01) |
| *B60R 11/02* | (2006.01) |
| *B60R 11/00* | (2006.01) |

(52) U.S. Cl.
CPC .............. *B60R 11/02* (2013.01); *B41J 15/042* (2013.01); *B41J 29/06* (2013.01); *B60R 2011/0052* (2013.01)

(58) Field of Classification Search
CPC .. B60R 11/02; B60R 2011/0052; B41J 5/042; B41J 29/06
See application file for complete search history.

(56) References Cited

U.S. PATENT DOCUMENTS

| | | | |
|---|---|---|---|
| 6,400,561 B1* | 6/2002 | Horton | B60R 11/0252 248/185.1 |
| 2010/0090508 A1* | 4/2010 | Cottrell | B60R 11/02 297/217.3 |
| 2016/0015167 A1* | 1/2016 | Abu-Akel | A47B 21/02 248/161 |

FOREIGN PATENT DOCUMENTS

| | | | | |
|---|---|---|---|---|
| CN | 207724317 U | * | 8/2018 | |
| CN | 211617104 U | * | 10/2020 | |
| CN | 212608316 U | * | 2/2021 | |
| CN | 216001896 U | * | 3/2022 | |
| DE | 4411156 A1 | * | 11/1994 | G06F 1/1628 |

(Continued)

*Primary Examiner* — Christopher E Mahoney
*Assistant Examiner* — Marissa Ferguson-Samreth
(74) *Attorney, Agent, or Firm* — The Dobrusin Law Firm, PC (57) ABSTRACT

The present invention provides a printer station for a vehicle comprising: a housing having a top surface member connected to two side members forming an interior housing channel, a printer sliding tray, and a vehicle mounting bracket wherein: the interior housing channel is designed to contain at least a portion of the printer sliding tray; each of the two side members of the housing includes a slide feature that accepts and allows the printer sliding tray to slide in and out of the interior housing channel; the vehicle mounting bracket is attached to the housing; the vehicle mounting bracket includes vehicle attachment features for attachment to a vehicle's interior; the printer tray is designed to contain a printer; and the printer tray includes a printer paper roll holding feature to contain a printer paper roll that feeds into the printer.

20 Claims, 6 Drawing Sheets

(56) References Cited

FOREIGN PATENT DOCUMENTS

DE 4108379 C2 * 6/1995 .............. B41J 29/06
EP 0758110 A1 * 2/1997

* cited by examiner

VEHICLE PRINTER MOUNT

FIELD OF INVENTION

The present invention relates to vehicle accessory field. More specifically, it relates to a printer mount or station for use in vehicles to conveniently secure a printer, a paper roll for the printer, and a mobile computer.

BACKGROUND OF INVENTION

Many commercial users of vehicles (especially police vehicles) need to easily access a mobile computer (e.g., laptop, tablets, small desktop computer, etc.) and a printer for their work. There are numerous mini portable printers suitable for use in vehicles such as the Brother PocketJet printers or the like. Conventional vehicle printer mounts or stations (hereinafter referred to as "stations") usually involve multiple (and often bulky) components for storage of the mobile computer, the printer, and the paper roll for the printer.

The present invention overcomes this problem by providing a vehicle printer station that is compact yet provides easily access to the printer, the printer paper roll, and the mobile computer by allowing the mobile computer to be stacked or placed on top of the vehicle printer station.

BRIEF DESCRIPTION OF THE DRAWING

The present invention will be more clearly understood when considering the accompanying drawing of which.

DESCRIPTION OF THE PREFERRED EMBODIMENT

Referring to FIGS. 1-6, the present invention provides a vehicle printer station 100 that can store a mobile computer 10, a mini portable printer 12 (such as the Brother PocketJet printers or the like), and a printer paper roll 14 for the printer 12, all in a compact and easily accessible station 100 allowing the mobile computer 10 to be stacked or placed (collectively hereinafter referred to as "situated") on top of the station 100. The station 100 includes a housing 16 and a vehicle mounting bracket 18. Both the housing 16 and the vehicle mounting bracket 18 include attachment features 20 (e.g., apertures or the like) for their attachment to each other via fasteners 22 such as screws, nuts, bolts, clips, etc.). In alternative embodiment, the housing 16 and the vehicle mounting bracket 18 are combined into a single integral structural component. Accordingly, the housing 16 is deemed to be "in communication" with the mounting bracket 18 by either attached via (i) the attachment features 20 and fasteners 22, or (ii) combined into a single integral structural component. The mounting bracket 18 also includes attachment features 20 for attachment via fasteners 22 such as screws, nuts, bolts, clips, etc. and/or other art-disclosed means (e.g., additional brackets, etc.) to a predetermined interior location of a vehicle such as vehicle console, dash, or other desired location.

Figure 1:
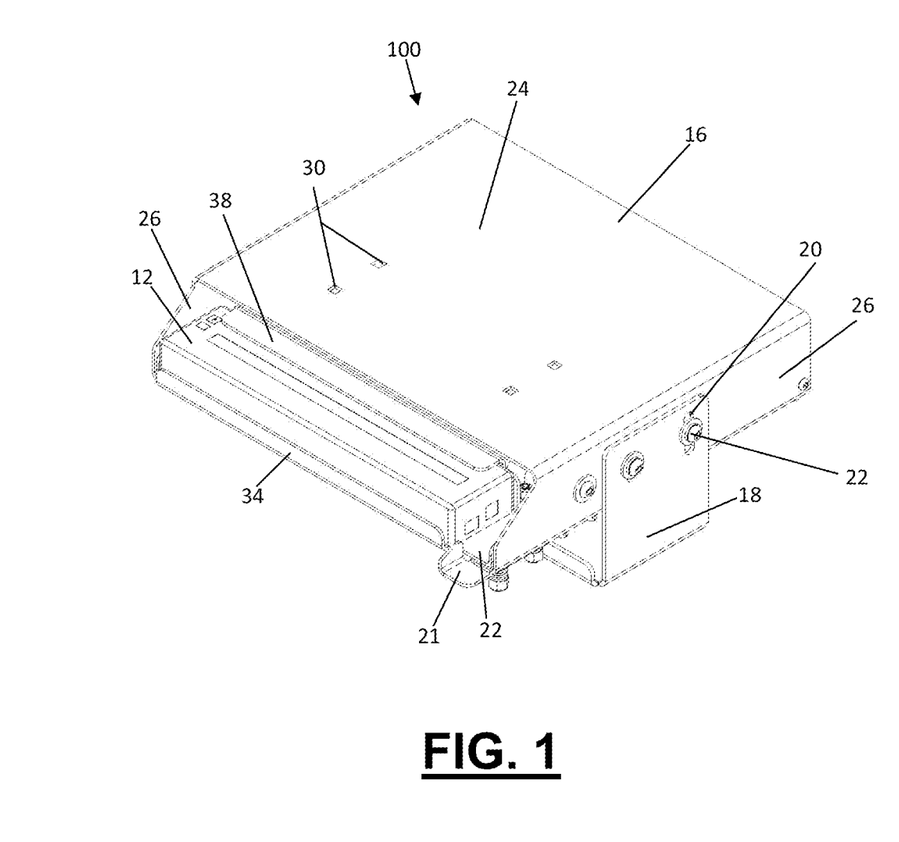
FIG. 1 shows a front prospective view of vehicle printer station in accordance with the principals of the present invention and with its printer sliding tray in a closed position.
Figure 2:
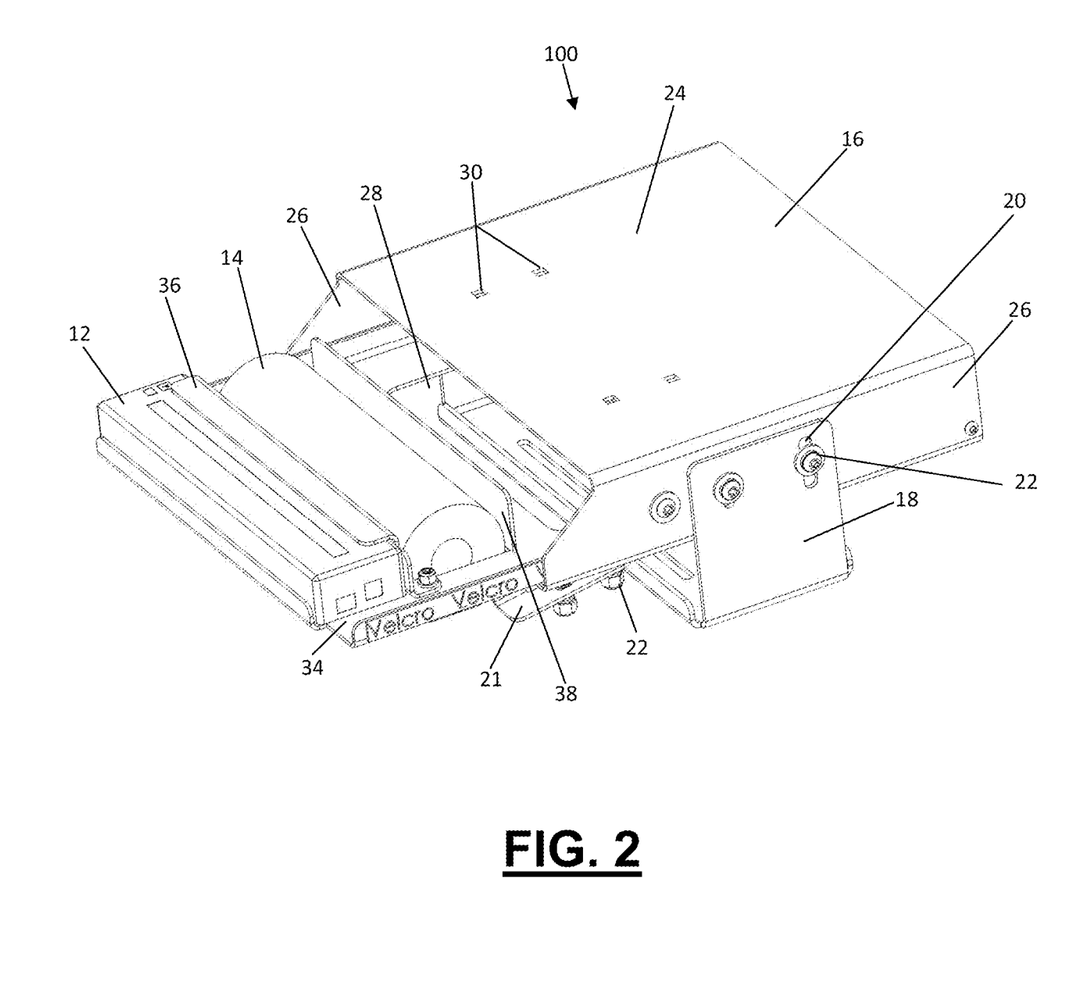
FIG. 2 shows a front prospective view of the vehicle printer station shown in FIG. 1 with its printer sliding tray in an opened position.
Figure 3:
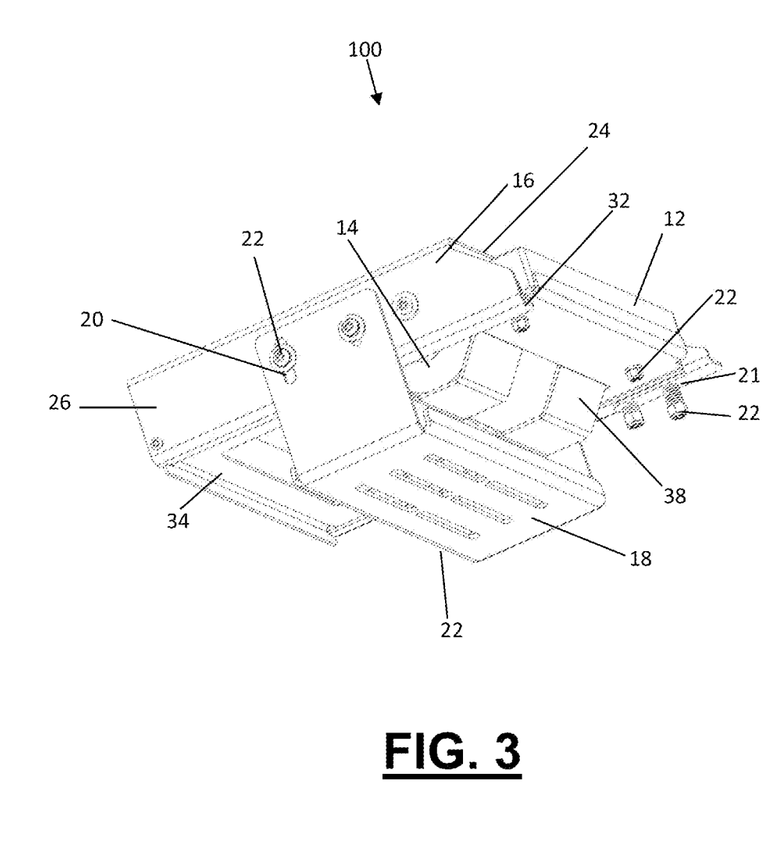
FIG. 3 shows a bottom prospective view of the vehicle printer station shown in FIG. 1.
Figure 4:
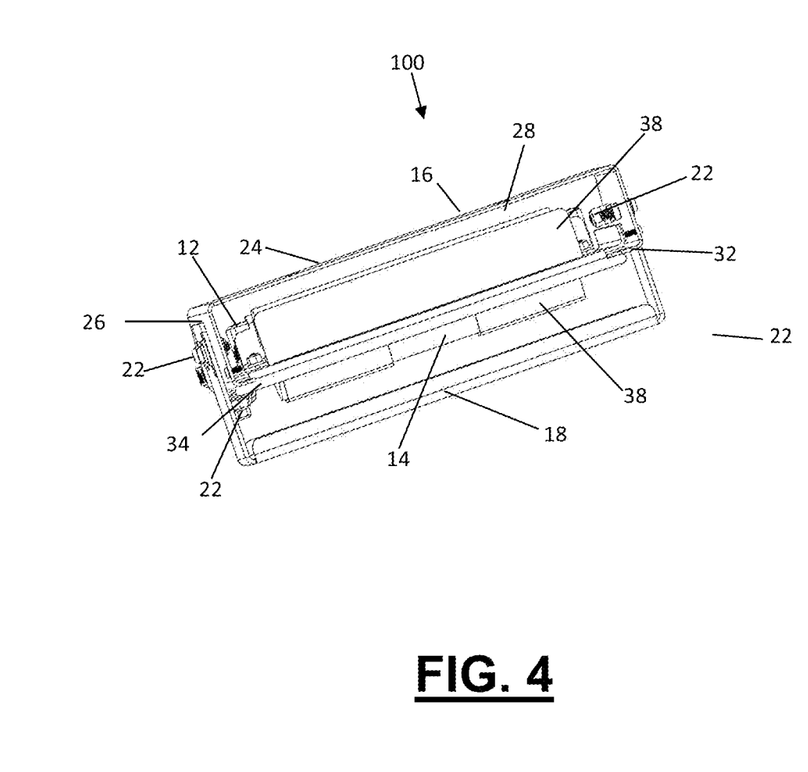
FIG. 4 shows a rear prospective view of the vehicle printer station shown in FIG. 1 with its various components.

The housing 16 includes a top surface member 24 connected to two side members 26 forming an interior housing channel 28 (or a cavity, opening or space). The top surface member 24 includes art-disclosed attachment means 30 (e.g., apertures for fasteners, mounting bracket(s) Velcro, or the like) for secured but removable attachment to the mobile computer 10. In one embodiment, the top surface member 24 and the two side members 26 are constructed out a single material (e.g., stamped or bended sheet metal, molded plastic, etc.) Each of the side members 26 includes a slide feature 32 designed to accept a printer sliding tray 34 allowing the tray 34 to slide in and out of the housing 16 via the interior housing channel 28. The slide feature 32 can be an extended member attached to the side member 26 as shown in FIGS. 3-4. The slide feature 32 optionally includes attachment features 20 for attachment of the tray 34 to the side feature 32 via fasteners 22. In one embodiment, the slide feature 32 includes a retainer 21 that uses art-disclosed means (e.g., coil spring or the like) to exert pressure on the retainer 21 allowing the retainer 21 to lock the printer slide tray 34 in place when the printer slide tray 34 is pushed back into the interior housing channel 28.

In one embodiment, the top member 18, the side members 26, and the slide features 32 can all be constructed of a single piece of material (e.g., aluminum, steel, metal alloys, plastic or other polymer(s), etc.) stamped bended, or molded into the desired shape for the housing 16 such as the housing 16 shown in FIGS. 1-6. Alternatively, the slide feature 32 can be a separate component attached to the side member 26 such as a conventional linear slide rail (e.g., a drawer slide rail or the like).

Figure 5:
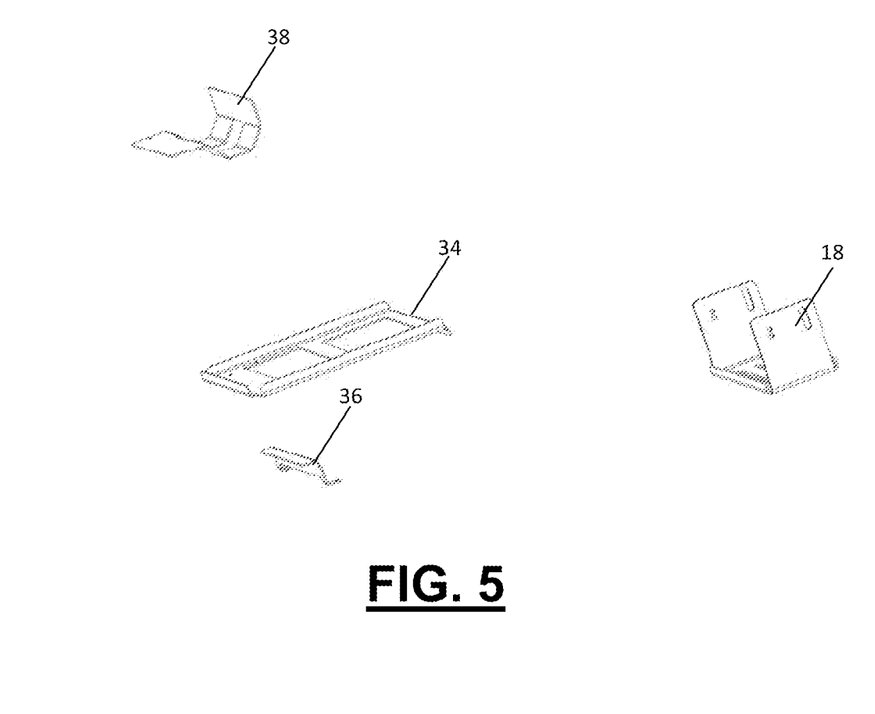
FIG. 5 shows a prospective view of certain components of the vehicle printer station shown in FIG. 1 such as the printer holder feature, the printer paper holder feature, the printer sliding tray, and the vehicle mounting bracket.

The printer sliding tray 32 is designed to contain the printer 12 and the printer paper roll 14. It is optionally preferred that the tray 34 includes a printer retaining feature 36 and a paper roll retaining feature 38 as shown separately in FIG. 5. The printer retaining feature 36 assists the tray 34 in retaining the printer 10 by clamping the printer 10 to the tray 34. The paper roll retaining feature 38 retains the printer paper roll 14 to the tray 34 and allows the roll 14 to easily roll and feed into the printer 12 (which is shown as an open structural channel member in FIG. 5). The printer paper roll holding feature 38 can be a separate component of the tray 34 as shown in FIG. 5 or formed/molded as an integral structural portion of the tray 34.

In an alternative embodiment, the paper roll holding feature 38 includes one spindle supported by having its two ends inserted into the recess features of two supporting members (e.g., like an art-disclosed toilet paper holder with a spindle or the like.) The spindle goes through the center of the printer paper roll 14 and holds the printer paper roll 14 within the tray 34. In another embodiment, the paper roll holding feature 32 has two extended members (e.g., rods) each attached to one of the supporting members. The two extended members are inserted into each end of the center of the printer paper roll 14.

Figure 6:
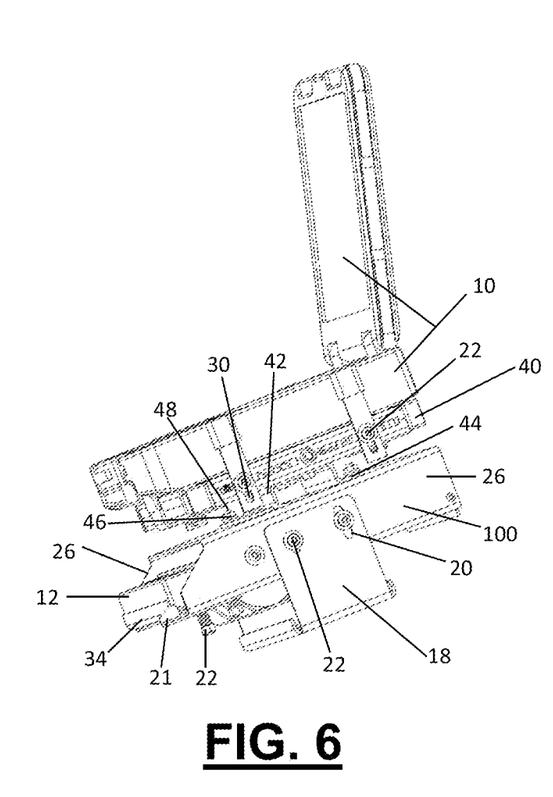
FIG. 6 shows a prospective top view of the vehicle printer station shown in FIG. 1 with a mobile computer attached to the station's top surface member via a computer tray.

The vehicle printer station 100 is designed to be compact yet provides easily access to the printer 12, the printer paper roll 14, and the mobile computer 10 by allowing the mobile computer 10 to be located on top of the top surface member 24 of the housing 16 of the vehicle printer station 100 as shown in FIG. 6. The mobile computer 10 can be attached directly to the top surface member 24 via the attachment means 30 and if desired additional fasteners 22. In one embodiment of the present invention and referring to FIG. 6, the mobile computer 10 is attached to a computer tray 40 via attachment means 30 (e.g., apertures for fasteners) and fasteners 22 (e.g., clips/brackets, bolts and nuts). The computer tray 40 is designed to extend its length and width in order to accommodate various sizes of the mobile computer 10. The computer tray 40 is attached to the top surface member 24 via attachment means 30 (e.g., apertures for fasteners) and fasteners 22 (e.g., a channel bracket 42 having flanges 44 with secured by nuts 46 and bolts 48).

The above-described components of the vehicle printer station 100 may be constructed out of any suitable art-disclosed material. Examples of such material are polycarbonate and other polymeric material, steel including but are not limited to stainless steel, cold rolled steel, mild steel, high strength steel, tempered steel, aluminum, and other metal alloys. The thickness of each individual component may vary. Examples of suitable thickness are in the range from about $1/16"$ to about $1/2"$ and from about 1 mm to about 6 mm. The exact size and shape of the printer station 100 will vary depending on the configuration of the printer 12, the printer paper roll 14, the mobile computer 10, and the space available within the vehicle for mounting of the printer station 100.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

What is claimed is:

1. A compact printer station for a vehicle comprising:
a housing having a top surface member connected to two side members forming an interior housing channel, a printer sliding tray designed to retain a mini portable printer, and a vehicle mounting bracket wherein:
   a. the top surface member having attachment means for attaching a mobile computer that allows the mobile computer to be situated above the top surface member in a secured fashion without requiring the housing to have a lid or side walls to be situated above the top surface member;
   b. the interior housing channel is designed to contain at least a portion of the printer sliding tray;
   c. each of the two side members of the housing includes a slide feature that accepts and allows the printer sliding tray to slide in and out of the interior housing channel;
   d. the vehicle mounting bracket is in communication with the housing;
   e. the vehicle mounting bracket includes vehicle attachment features for attachment to a vehicle's interior;
   f. the printer sliding tray having a printer retaining feature designed to assist the printer sliding tray in retaining the mini portable printer by attaching the mini portable printer to a front portion of the printer sliding tray;
   g. the printer sliding tray having a printer paper roll holding feature designed to contain a printer paper roll that feeds into the mini portable printer;
   h. the printer roll holding feature is located behind and below the printer retaining feature; and
   i. the interior housing channel and the printer sliding tray form a compact space that retains the mini portable printer and the printer paper roll between the interior housing channel and the printer sliding tray.

2. The printer station of claim 1 wherein both the housing and the vehicle mounting bracket include attachment features and the housing and vehicle mounting bracket are attached to each other via the attachment features and fasteners.

3. The printer station of claim 2 wherein the fasteners are nuts and bolts and the attachment features are apertures for use with the nuts and the bolts.

4. The printer station of claim 1 wherein the slide feature is an extended member of the side member.

5. The printer station of claim 1 wherein the slide feature is a linear slide rail.

6. The printer station of claim 5 wherein the open structural channel member is a separate physical component of the printer sliding tray.

7. The printer station of claim 6 wherein the printer paper roll holding feature is an open structural channel member.

8. The printer station of claim 1 wherein the printer retaining feature is a separate physical component of the printer sliding tray.

9. The printer station of claim 1 wherein the printer paper roll holding feature is integral part of the printer sliding tray and includes two supporting members each having a recess feature and a spindle having two ends, wherein
   the spindle is designed to extend through center of the printer paper roll; and
   the spindle is supported by the two supporting member by having the two ends inserted into the recess features.

10. The printer station of claim 1 wherein the printer paper roll holding feature is integral part of the printer sliding tray and includes two supporting members each having an extended member designed to extend into an end of center of the printer paper roll.

11. The printer station of claim 1 wherein the vehicle bracket mount is an integral part of the housing.

12. The printer station of claim 1 wherein the housing is constructed of steel.

13. The printer station of claim 1 wherein the housing is constructed of aluminum.

14. The printer station of claim 1 wherein the housing is constructed of plastic.

15. The printer station of claim 1 wherein the attachment means are Velcro for attaching the mobile computer to the top surface member of the housing.

16. The printer station of claim 1 wherein the attachment means are apertures for used with fasteners and the fasteners includes at least one bracket, nuts and bolts.

17. The printer station of claim 1 wherein the mobile computer is attached to a computer tray and the computer tray is attached to the top surface member of the housing.

18. The printer station of claim 17 wherein the computer tray is designed to extend in its length and width in order to accommodate and to secure any sizing of the mobile computer.

19. A compact printer station for a vehicle comprising:
a housing having a top surface member connected to two side members forming an interior housing channel, a printer sliding tray designed to retain a mini portable printer, and a vehicle mounting bracket wherein:
a. the top surface member having attachment means for attaching a computer tray;
b. the computer tray having attachment means for attaching a mobile computer that allows the mobile computer to be situated above both the computer tray and the top surface member in a secured fashion without requiring the housing to have a lid or side walls to be situated above the top surface member;
c. the interior housing channel is designed to contain at least a portion of the printer sliding tray
d. each of the two side members of the housing includes a slide feature that accepts and allows the printer sliding tray to slide in and out of the interior housing channel;
e. the vehicle mounting bracket is in communication with the housing;
f. the vehicle mounting bracket includes vehicle attachment features for attachment to a vehicle's interior;
g. the printer sliding tray having a printer retaining feature designed to assists the printer sliding tray in retaining the mini portable printer by clamping the mini portable printer to a front portion of the printer sliding tray;
h. the printer sliding tray having a printer paper roll holding feature designed to contain a printer paper roll that feeds into the mini portable printer; and
i. the printer roll holding feature is located behind and below the printer retaining feature.

20. A compact printer station for a vehicle comprising:
a housing having a top surface member connected to two side members forming an interior housing channel, a printer sliding tray designed to retain a mini portable printer, and a vehicle mounting bracket wherein:
a. the top surface member having attachment means for attaching a mobile computer that allows the mobile computer to be situated above the top surface member in a secured fashion without requiring the housing to have a lid or side walls to be situated above the top surface member;
b. the interior housing channel is designed to contain at least a portion of the printer sliding tray;
c. each of the two side members of the housing includes a slide feature that accepts and allows the printer sliding tray to slide in and out of the interior housing channel;
d. the vehicle mounting bracket is in communication with the housing;
e. the vehicle mounting bracket includes vehicle attachment features for attachment to a vehicle's interior;
f. the printer sliding tray having a printer retaining feature designed to assist the printer sliding tray in retaining the mini portable printer by clamping the mini portable printer to a front portion of the printer sliding tray;
g. the mini portable printer's longitudinal width is lesser than the mobile computer's longitudinal width;
h. the printer sliding tray having a printer paper roll holding feature designed to contain a printer paper roll that feeds into the mini portable printer; and
i. the printer roll holding feature is located behind and below the printer retaining feature.

\* \* \* \* \*